(12) United States Patent
Sablak et al.

(10) Patent No.: US 9,876,993 B2
(45) Date of Patent: Jan. 23, 2018

(54) VIDEO TRACKING SYSTEM AND METHOD

(75) Inventors: Sezai Sablak, Lancaster, PA (US); David N. Katz, Hummelstown, PA (US); Miroslav Trajkovic, Ossining, NY (US); Michael D. Bolotine, Denver, PA (US); Damian M. Lyons, Putnam Valley, NY (US)

(73) Assignees: Bosch Security Systems, Inc., Fairport, NY (US); Robert Bosch GmbH, Stuttgart (DE)

( * ) Notice: Subject to any disclaimer, the term of this patent is extended or adjusted under 35 U.S.C. 154(b) by 575 days.

(21) Appl. No.: 13/249,536

(22) Filed: Sep. 30, 2011

(65) Prior Publication Data

US 2012/0081552 A1 Apr. 5, 2012

Related U.S. Application Data

(63) Continuation of application No. 10/306,509, filed on Nov. 27, 2002, now abandoned.

(51) Int. Cl.
*H04N 7/18* (2006.01)
*H04N 5/232* (2006.01)
*H04N 5/77* (2006.01)

(52) U.S. Cl.
CPC ......... *H04N 7/183* (2013.01); *H04N 5/23212* (2013.01); *H04N 5/23216* (2013.01); *H04N 5/23219* (2013.01); *H04N 5/77* (2013.01)

(58) Field of Classification Search
USPC ............. 348/143, 152, 155, 169–172, 207.1, 348/207.11, 208.14, 211.99, 211.4–211.8
See application file for complete search history.

(56) References Cited

U.S. PATENT DOCUMENTS

| | | |
|---|---|---|
| 3,943,561 A | 3/1976 | Biddlecomb |
| 4,403,256 A | 9/1983 | Green et al. |
| 4,410,914 A | 10/1983 | Siau |
| 4,476,494 A | 10/1984 | Tugayé |
| 4,897,719 A | 1/1990 | Griffin |
| 4,945,367 A | 7/1990 | Blackshear |
| 4,959,725 A | 9/1990 | Mandle |
| 5,012,347 A | 4/1991 | Fournier |
| 5,237,405 A | 8/1993 | Egusa et al. |
| 5,264,933 A | 11/1993 | Rosser et al. |
| 5,353,392 A | 10/1994 | Luquet et al. |
| 5,371,539 A | 12/1994 | Okino et al. |
| 5,430,480 A | 7/1995 | Allen et al. |
| 5,436,672 A | 7/1995 | Medioni et al. |
| 5,438,360 A | 8/1995 | Edwards |
| 5,491,517 A | 2/1996 | Kreitman et al. |

(Continued)

FOREIGN PATENT DOCUMENTS

| | | |
|---|---|---|
| EP | 0 557 007 A2 | 8/1993 |
| EP | 1081955 A2 | 3/2001 |

(Continued)

OTHER PUBLICATIONS

T.E. Boult, R. Michaels, A. Ekran, P. Lewis, C. Powers, C. Qian, and W. Yin, "*Frame-Rate Multi-Body Tracking for Surveillance*," Proceeding of the DARPA Image Understanding Workshop, Nov. 1998.

(Continued)

*Primary Examiner* — Daniel M Pasiewicz
(74) *Attorney, Agent, or Firm* — Faegre Baker Daniels LLP

(57) ABSTRACT

A video tracking system and method are provided for tracking a target object with a video camera.

13 Claims, 5 Drawing Sheets

(56) References Cited

U.S. PATENT DOCUMENTS

| | | |
|---|---|---|
| 5,502,482 A | 3/1996 | Graham |
| 5,517,236 A | 5/1996 | Sergeant et al. |
| 5,528,319 A | 7/1996 | Austin |
| 5,552,823 A | 9/1996 | Kageyama |
| 5,563,652 A | 10/1996 | Toba et al. |
| 5,608,703 A | 3/1997 | Washisu |
| 5,610,653 A | 3/1997 | Abecassis |
| 5,627,616 A | 5/1997 | Sergeant et al. |
| 5,629,984 A | 5/1997 | McManis |
| 5,629,988 A | 5/1997 | Burt et al. |
| 5,648,815 A | 7/1997 | Toba |
| 5,731,846 A | 3/1998 | Kreitman et al. |
| 5,754,225 A | 5/1998 | Naganuma |
| 5,798,786 A | 8/1998 | Laureau et al. |
| 5,798,787 A | 8/1998 | Yamaguchi et al. |
| 5,801,770 A | 9/1998 | Paff et al. |
| 5,835,138 A | 11/1998 | Kondo |
| 5,909,242 A | 6/1999 | Kobayashi et al. |
| 5,926,212 A | 7/1999 | Kondo |
| 5,953,079 A | 9/1999 | Burl et al. |
| 5,963,248 A | 10/1999 | Ohkawa et al. |
| 5,963,371 A | 10/1999 | Needham et al. |
| 5,969,755 A | 10/1999 | Courtney |
| 5,973,733 A | 10/1999 | Gove |
| 5,982,420 A | 11/1999 | Ratz |
| 6,067,399 A | 5/2000 | Berger |
| 6,100,925 A | 8/2000 | Rosser et al. |
| 6,144,405 A | 11/2000 | Toba |
| 6,154,317 A | 11/2000 | Segerstrom et al. |
| 6,173,087 B1 | 1/2001 | Kumar |
| 6,181,345 B1 | 1/2001 | Richards |
| 6,208,379 B1 | 3/2001 | Oya et al. |
| 6,208,388 B1 | 3/2001 | Wilf et al. |
| 6,211,912 B1 | 4/2001 | Shahraray |
| 6,211,913 B1 | 4/2001 | Hansen et al. |
| 6,263,088 B1 | 7/2001 | Crabtree et al. |
| 6,295,367 B1 | 9/2001 | Crabtree et al. |
| 6,384,871 B1 | 5/2002 | Wilf et al. |
| 6,396,961 B1 | 5/2002 | Wixson et al. |
| 6,424,370 B1 | 7/2002 | Courtney |
| 6,437,819 B1 | 8/2002 | Loveland |
| 6,441,864 B1 | 8/2002 | Minami et al. |
| 6,442,474 B1 | 8/2002 | Trajkovic et al. |
| 6,478,425 B2 | 12/2002 | Trajkovic et al. |
| 6,507,366 B1 | 1/2003 | Lee |
| 6,509,926 B1 | 1/2003 | Mills et al. |
| 6,628,711 B1 | 9/2003 | Mathew et al. |
| RE38,420 E | 2/2004 | Thomas |
| 6,734,901 B1 | 5/2004 | Kudo et al. |
| 6,778,210 B1 | 8/2004 | Sugahara et al. |
| 6,781,622 B1 | 8/2004 | Sato et al. |
| 6,809,760 B1 | 10/2004 | Takagi et al. |
| 2001/0002843 A1 | 6/2001 | Yata |
| 2001/0046309 A1 | 11/2001 | Kamei |
| 2002/0008758 A1 | 1/2002 | Broemmelsiek et al. |
| 2002/0030741 A1 | 3/2002 | Broemmelsiek |
| 2002/0051057 A1 | 5/2002 | Yata |
| 2002/0054210 A1 | 5/2002 | Glier et al. |
| 2002/0140813 A1 | 10/2002 | Trajkovic et al. |
| 2002/0140814 A1 | 10/2002 | Cohen-Solal et al. |
| 2002/0167537 A1 | 11/2002 | Trajkovic |
| 2002/0168091 A1 | 11/2002 | Trajkovic |
| 2003/0035051 A1 | 2/2003 | Cho et al. |
| 2003/0137589 A1 | 7/2003 | Miyata |
| 2003/0227555 A1 | 12/2003 | Kobayashi et al. |
| 2004/0130628 A1 | 7/2004 | Stavely |
| 2005/0157169 A1 | 7/2005 | Brodsky et al. |

FOREIGN PATENT DOCUMENTS

| | | |
|---|---|---|
| GB | 2305051 A | 3/1997 |
| GB | 2316255 A | 2/1998 |
| GB | 2411310 A | 8/2005 |
| GB | 2414885 A | 12/2005 |
| JP | 62229082 | 10/1987 |
| JP | 03286211 | 12/1991 |
| JP | 5083712 A | 4/1993 |
| JP | 05-346958 | 12/1993 |
| JP | H07-114642 | 5/1995 |
| JP | 08-123784 A | 5/1996 |
| JP | 9127227 A | 5/1997 |
| JP | 2000-83246 | 3/2000 |
| JP | 2001-061137 A | 3/2001 |
| JP | 2001-285695 | 10/2001 |
| JP | 2001-285850 | 10/2001 |
| JP | 2002-135766 | 5/2002 |
| WO | WO 94/28377 | 12/1994 |
| WO | WO 98/47117 A1 | 10/1998 |
| WO | WO 01/69930 A1 | 9/2001 |
| WO | WO 01/69932 A1 | 9/2001 |

OTHER PUBLICATIONS

I. Haritaoğlu, D. Harwood, and L.S. Davis, "*W4: Real-time surveillance of People and their Activities*," IEEE Trans. Pattern Analysis and Machine Intelligence, 22(8): 809-830, Aug. 2000.

I. Haritaoğlu, et al., *Who? When? Where? What? A real Time System for Detecting and Tracking People*. International Conference on Face and Gesture Recognition; Nara, Japan, Apr. 14-16, 1998.

J. Segen and G. Pingali, "*A Camera-based System for Tracking People in Real Time*," In Proc. International Conference on Pattern Recognition, pp. 63-67, 1996.

C.R. Wren, A. Azarbayejani, T. Darrell, and A.P. Pentland, "*Pfinder: Real-time Tracking of the Human Body*," IEEE Trans. Pattern Analysis and Machine Intelligence, 19(7): 780-785, Jul. 1997.

S. Sablak and T.E. Boult, "*Multilevel Color Histogram Representation of Color Images by Peaks for Omni-Camera*," Proceeding of IASTED International Conference, Signal and Image Processing, Oct. 18-21, 1999.

H. Hua and N. Ahuja, "*A High-Resolution Panoramic Camera*," IEEE Computer Society Conference on Computer Vision and Pattern Recognition (CVPR'01), vol. 1, pp. 960-967, Dec. 2001.

S.K. Nayar, "*Catadioptric Omnidirectional Camera*," IEEE Computer Society Conference on Computer Vision and Pattern Recognition (CVPR'97), pp. 482-488, 1997.

P.I. Anderson, "*From Telepresence to True Immersive Imaging: into Real-Life Video-Now!*," Advanced Imaging, vol. 10(7), pp. 48-50, 1995.

N.T. Siebel and S.JH. Maybank, "*Real-Time Tracking of Pedestrians and vehicles*," Proceedings 2$^{nd}$ IEEE Int. Workshop on Performance Evaluation of Tracking and Surveillance (PETS'01), Dec. 9, 2001.

K. Sato and J.K. Aggarwal, "*Tracking Person and Vehicles in Outdoor Image Sequences Using Temporal Spatio-Velocity Transform*," Proceedings 2$^{nd}$ IEEE Int. Workshop on Performance Evaluation of Tracking and Surveillance (PETS '01), Dec. 9, 2001.

T. Ellis and M. Xu, "*Object Detection and Tracking in an Open and Dynamic World*" Proceedings 2$^{nd}$ IEEE Int. Workshop on Performance Evaluation of Tracking and Surveillance (PETS '01), Dec. 9, 2001.

L.M. Fuentes and S.A. Velastin, "*People Tracking in Surveillance Applications*," Proceedings 2$^{nd}$ IEEE Int Workshop on Performance Evaluation of Tracking and Surveillance (PETS '01), Dec. 9, 2001.

M. Trajkovic, "*Tracking Surveillance Targets with a Pan-Tilt-Zoom Camera*," Fifth Asian Conference on Computer Vision, Jan. 2002.

S.S. Intille, J.W. Davis and A.F. Bobick, "*Real-time Closed-World Tracking*," Proceedings of the IEEE Conference on Computer Vision and Pattern Recognition (CVPR'97), Jun. 1997, pp. 697-703.

M. Trajkovic, "*Interactive Calibration of a PTZ Camera for Surveillance Applications*," in Proc. Asian Conference Computer Vision, Melbourne, Jan. 2002.

M. Trajkovic, Thesis, "*Motion Analysis of Monocular Video Sequences*," Department of Electrical Engineering, University of Sydney, Mar. 1999.

LTC 8500 Series Allegiant® Microprocessor-Based Video Switcher/Control Systems, Philips Communication & Security Systems, Inc. (1998).

(56) References Cited

OTHER PUBLICATIONS

TriMedia TM-1300, Programmable Media Processor, Philips Electronics North America Corporation (1999).
Philips G3 Autodome® Camera Systems, Philips Communication, Security & Imaging, Inc. (believed to be at least as early as Oct. 2001).
G3 Autodome® Indoor Systems, Philips Communication, Security & Imaging, Inc. (2000).
Fernando de la toree Frade, et al., "*Moving object detection and tracking system: a real-time implementation*", Seizieme Colloque Gretsi, Sep. 15-19, 1997, pp. 375-378.
Carl-Henrik Oertel, "*Computer vision sensor for autonomous helicopter hover stabilization*", SPIE vol. 3088, pp. 121-129, (1977).
Kurazume et al, "*Development of image stabilization system for remote operation of walking robots*", IEEE vol. 2, pp. 1856-1861, (2000).
Armel Cretual et al., "*Dynamic Stabilization of a Pan and Tilt Camera for Submarine Image Visualization*", Computer Vision and Image Understanding 79, pp. 47-65, (2000).
A. Stern, et al., "*Stabilization, restoration and resolution enhancement of a video sequence captured by a moving and vibrating platform*", Applications of Digital Image Processing XXIV, pp. of SPIE vol. 4472 (2001) pp. 65-745/24/04.
Jesse S. Jin et al., "*A Stable Vision System for Moving Vehicles*", IEEE Transactions of Intelligent Transportation System, vol. 1, No. 1, Mar. 2000, pp. 32-39.
Bolan Jiang et al., "*Camera Tracking for Augmented Reality Media*", 2000 IEEE, vol. III, pp. 1637-1640.
J.P. Lewis, "*Fast Normalized Cross-Correlation*", expanded version of a paper from Vision Interface, 1995 (reference 110]).
Isrnail Oner Sebe, et al., "*A Novel Affine Template Matching Method and Its Application to Real-Time Tracking*", AST San Diego Lab, STMicroelectronics Inc.
Frederic Jurie et al., "*A simple and efficient template matching algorithm*", LASMEA—UMR 6602 of CNRS, Blaise-Pascal University, F-63177 Aubiere, France.
Frederic Jude et al., "*Real Time Robust Template Matching*", LASMEA—UMR 6602, Universite Blaise-Pascal, F-63177 Aubiere, France, pp. 123-132.
Webpage: www.polywelLcom/security/digitall/apps.html Digital Video System Basic System::Applications.
New Product Announcement; Integral Technologies, Inc., First Line DVA Digital Recorder, Mar. 1, 2002.
Product Brochure; Primary Image, Videotracker Digital Video Motion Detector, 1998.
Webpage: www.dvrsecuritysystems.com, DVR Security Systems, Sentry V800 Series Digital Video Recorders.
Webpage: www.intelligentvideosystems.com, Products page, Remote Station.
Webpage: www.spacewalker.com, Shuttle NVS, Digital Video Recorder.
Webpage: wwwskywaysecurity.com, Remote Video Surveillance systems, G-MAS Economy 6000 Series Digital Video Recorders.
Product Brochure, Fire Sentry Corporation, VSD-8 Visual Smoke Detection System, 2001.
English Translation (human) of JP05-346958 to Kuno published Dec. 27, 1993.
European Search Report, Application No. EP 03 02 6979.9, dated Feb. 26, 2004.

VIDEO TRACKING SYSTEM AND METHOD

CROSS REFERENCE TO RELATED APPLICATION

This application is a continuation of U.S. application Ser. No. 10/306,509, filed on Nov. 27, 2002, the disclosure of which is incorporated by reference herein.

BACKGROUND AND SUMMARY

The present invention relates to a video camera system for tracking a moving object.

Description of the Related Art

There are numerous known video surveillance systems which may be used to track a moving object such as a person or vehicle. Some such systems utilize a fixed camera having a stationary field of view (FOV). To fully cover a given surveillance site with a fixed camera system, however, it will oftentimes be necessary to use a significant number of fixed cameras.

Movable cameras which may pan, tilt and/or zoom may also be used to track objects. The use of a PTZ (pan, tilt, zoom) camera system will typically reduce the number of cameras required for a given surveillance site and also thereby reduce the number and cost of the video feeds and system integration hardware such as multiplexers and switchers associated therewith.

Visual surveillance systems will also often rely upon human operators. The use of human operators, however, is subject to several limiting factors such as relatively high hourly costs, susceptibility to fatigue when performing tedious and boring tasks, inability to concentrate on multiple images simultaneously and accidental/intentional human error. To reduce the impact of such human limitations, automated video tracking systems have been used to assist or replace human operators.

Three primary steps typically employed in automated video tracking systems involve background subtraction, target detection and target tracking. The use of fixed cameras greatly simplifies and speeds the background subtraction and target detection processes. When a PTZ system is employed, the camera is typically repositioned by analyzing the motion of the target object and predicting a future location of the target object. The camera is then adjusted to reposition the estimated future location of the target object in the center of the FOV. The camera may then remain stationary as the target object moves away from the center of the FOV and a new estimated future target location is computed. The camera will then be repositioned to once again recenter the target object. Such discrete camera movements are continually repeated to track the target object. Conventionally, each discrete camera movement occurs at the fastest camera movement speeds available wherein each of the panning movements will be conducted at a common pan rate, each of the tilting movements will be conducted at a common tilt rate and each of the zooming movements, i.e., adjusting the focal length of the camera, will be conducted at a common zoom rate. The resulting series of discrete camera movements typically leads to a video image which is "jumpy" in comparison to a video image produced by the manual tracking of a target object by a skilled human operating a joystick or other camera control.

The present invention provides an automated video tracking system having a movable camera wherein the automatic adjustment of the camera when tracking a target object may be done continuously and at various speeds to provide a video image with relatively smooth transitional movements during the tracking of the target object.

The invention comprises, in one form thereof, a video tracking system which includes a video camera having a field of view wherein the camera is selectively adjustable and adjustment of the camera varies the field of view of the camera. Also included is at least one processor which is operably coupled to the camera. The processor receives video images acquired by the camera and selectively adjusts the camera. The processor is programmed to detect a moving target object in the video images and adjust the camera to track the target object wherein the processor adjusts the camera at a plurality of varied adjustment rates.

The invention comprises, in another form thereof, a video tracking system including a video camera having a field of view wherein the camera is selectively adjustable and adjustment of the camera varies the field of view of the camera. Also included in the system is at least one processor which is operably coupled to the camera. The processor receives video images acquired by the camera and selectively adjusts the camera. The processor is programmed to detect a moving target object in the video images and estimate a target value wherein the target value is a function of a property of the target object. The property may be the velocity of the target object. The processor adjusts the camera at a selected adjustment rate which is a function of the target value.

In alternative embodiments, such systems may include a processor which selects the adjustment rate of the camera as a function of at least one property of the target object. The at least one property of the target object may include the velocity of the target object. The camera may be selectively adjustable at a variable rate in adjusting at least one of a panning orientation of the camera and a tilt orientation of the camera.

The processor may also be programmed to select the adjustment rate of the camera based upon analysis of a first image and a second image wherein the first image is acquired by the camera adjusted to define a first field of view and the second image is acquired by the camera adjusted to define a second field of view. The first and second fields of view may be partially overlapping and the determination of the selected adjustment rate by the processor may include identifying and aligning at least one common feature represented in each of the first and second images. The camera may also define a third field of view as the camera is being adjusted at the selected adjustment rate with a third image being acquired by the camera when it defines the third field of view and wherein the first, second and third images are consecutively analyzed by the processor. The camera may have a selectively adjustable focal length and the processor may select the focal length of the camera as a function of the distance of the target object from the camera.

The adjustment of the camera may include selective panning movement of the camera wherein the panning movement defines an x-axis, selective tilting movement of the camera wherein the tilting movement defines a y-axis, and selective focal length adjustment of the camera wherein adjustment of the focal length defines a z-axis with the x, y and z axes being oriented mutually perpendicular. The processor may adjust the camera at a selected panning rate which is a function of the velocity of said target object along the x-axis and at a selected tilting rate which is a function of the velocity of the target object along the y-axis. The camera may also be adjusted at a first selected adjustment rate until the processor selects a second adjustment rate and communicates the second adjustment rate to the camera.

The tracking system may also include a display device and an input device operably coupled to said system wherein an operator may view the video images on the display device and input commands or data into the system through the input device. The display device and input device may be positioned remotely from said camera.

The invention comprises, in yet another form thereof, a video tracking system including a video camera having a field of view wherein the camera is selectively adjustable and adjustment of the camera varies the field of view of the camera. The system also includes at least one processor operably coupled to the camera. The processor receives video images acquired by the camera and selectively adjusts the camera. The processor is programmed to detect a moving target object in the video images and adjust the camera and track the target object. During tracking of the target object, the processor communicates a plurality of commands to the camera and the camera is continuously and variably adjustable in accordance with the commands without intervening stationary intervals.

The camera of such a system may be selectively adjustable at a variable rate in adjusting at least one, or each, of a panning orientation of the camera and a tilt orientation of the camera. The camera may acquire images for analysis by the processor while being adjusted and the continuous and variable adjustment of the camera includes varying either a direction of adjustment or a rate of adjustment. The commands may involve a first command which adjusts the camera at a selected rate and direction until a second command is received by the camera.

The invention comprises, in still another form thereof, a video tracking system including a video camera having a field of view wherein the camera is selectively adjustable and adjustment of the camera varies the field of view of the camera. The system also includes at least one processor operably coupled to the camera wherein the processor receives video images acquired by the camera and selectively adjusts the camera. The processor is programmed to detect a moving target object in the video images and adjust the camera and track the target object. The processor can consecutively analyze first, second and third images acquired by the camera wherein each of the images records a different field of view. The processor communicates to the camera a first command selectively adjusting the camera and a second command selectively adjusting the camera. The camera is adjusted in accordance with the first command during at least a portion of a first time interval between acquisition of the first and second images. The camera is adjusted in accordance with the second command during at least a portion of a second time interval between acquisition of the second and third images. The camera is continuously adjusted between acquisition of the first image and the third image.

The invention comprises, in another form thereof, a method of tracking a target object with a video camera. The method includes providing a video camera which has a field of view and is selectively adjustable wherein adjustment of the camera varies the field of view of the camera. The method also includes adjusting the camera at a selectively variable adjustment rate to track a target object. The adjustment rate may be selected as a function of at least one property of the target object.

The invention comprises, in yet another form thereof, a method of tracking a target object with a video camera. The method includes providing a video camera which has a field of view and is selectively adjustable wherein adjustment of the camera varies the field of view of the camera. The method also includes detecting a target object in images acquired by said camera, estimating a target value which is a function of at least one property of the target object and adjusting the camera at a selectively variable rate wherein the adjustment rate of the camera rate is selected as a function of the target value.

In alternative embodiments of the above-described methods, the at least one property of the target object may include the velocity of the target object. The adjustment rate may be selected based upon analysis of a first image and a second image wherein the first image is acquired by the camera when adjusted to define a first field of view and the second image is acquired by the camera when adjusted to define a second field of view. The first and second fields of view may be partially overlapping and the determination of the adjustment rate may include identifying and aligning at least one common feature represented in each of the first and second images. The adjusting of the camera at a selectively variable adjustment rate may include adjusting at least one, or each, of a panning orientation of the camera and a tilt orientation of the camera and the selected variable adjustment rates may be selected as a function of the velocity of the target object. The determination of the adjustment rates may also involve the use of a proportionality factor which is a function of the real world distance of the target object from the camera. The adjustment of the camera may also include adjusting the camera at a first selected adjustment rate until a second selected adjustment rate is communicated to the camera.

The invention comprises, in another form thereof, a method of tracking a target object with a video camera. The method includes providing a video camera which has a field of view and is selectively adjustable wherein adjustment of the camera varies the field of view of the camera. The method also includes adjusting the camera to track a target object wherein the adjustment of the camera includes selectively and variably adjusting at least one adjustment parameter and wherein the camera is continuously adjustable during the selective and variable adjustment of the at least one adjustment parameter.

The selective and variable adjustment of at least one adjustment parameter of the camera may include the adjustment of at least one, or each, of a panning orientation of said camera and a tilt orientation of said camera. The adjustment of such parameters may be selective and variable. The selective and variable adjustment of such parameters may include the varying of either the direction of adjustment or the rate of adjustment and the rate of adjustment may be selected as a function of the velocity of the target object.

The invention comprises, in another form thereof, a method of tracking a target object with a video camera. The method includes providing a video camera which has a field of view and is selectively adjustable wherein adjustment of the camera varies the field of view of the camera. The method also includes detecting a target object in images acquired by the camera and acquiring first, second and third images wherein each of the first, second and third images record a different field of view. The method also includes communicating a first command to the camera selectively adjusting the camera and communicating a second command to the camera selectively adjusting the camera. Further included is the step of continuously adjusting the camera between acquisition of the first image and acquisition of the third image wherein the camera is adjusted in accordance with the first command during at least a portion of a first time interval between acquisition of the first image and acquisition of the second image and the camera is adjusted in accordance with the second command during at least a portion of a second time interval between acquisition of the second image and acquisition of the third image.

The first and second commands may selectively adjust at least one, or each, of a panning orientation of the camera and a tilt orientation of the camera. The adjustment of such parameters may be at a selectively variable adjustment rate and the rates may be selected as a function of the velocity of the target object.

The invention comprises, in yet another form thereof, a video tracking system having a video camera with a selectively adjustable focal length. Also included is at least one processor operably coupled to said camera wherein the processor receives video images acquired by the camera and selectively adjusts the focal length of the camera. The processor is programmed to detect a moving target object in the video images and adjust the focal length of the camera as a function of the distance of the target object from the camera. The camera of the system may also have a selectively adjustable panning orientation and a selectively adjustable tilting orientation wherein the processor adjusts the panning orientation and the tilting orientation to maintain the target object centered in the video images and selectively adjusts the focal length of the camera as a function of the tilt angle.

The invention comprises, in still another form thereof, a method of automatically tracking a target object with a video camera. The method includes providing a video camera having a selectively adjustable focal length and adjusting the focal length of the camera as a function of the distance of the target object from the camera. The camera used with such a method may also have a selectively adjustable panning orientation and a selectively adjustable tilting orientation wherein tracking the object involves adjusting the panning and tilting orientation of the camera and selectively adjusting the focal length of the camera as a function of the tilt angle of camera.

An advantage of the present invention is that it provides video images which reflect relatively fluid transitional camera movements during the tracking of the target object and which do not "jump" from point to point when tracking the target object. The resulting video is typically regarded as more pleasant to view and less distracting to human operators who are viewing the video to observe the behavior of the target object.

Another advantage of the present invention is that it allows for images acquired for automatic tracking purposes to be obtained while the camera is in motion and thus does not require the camera to rest in a stationary position for image acquisition during the tracking of a target object.

Yet another advantage of the present invention is that it allows the system to continue tracking a target object while a human operator manually repositions the camera because the tracking system may utilize a series of images which do not have a common field of view to track the target object.

Still another advantage of the present invention is that it may be used with conventional pan, tilt, zoom (PTZ) cameras and, thus, facilitates the retrofitting and upgrading of existing installations having such conventional PTZ cameras.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
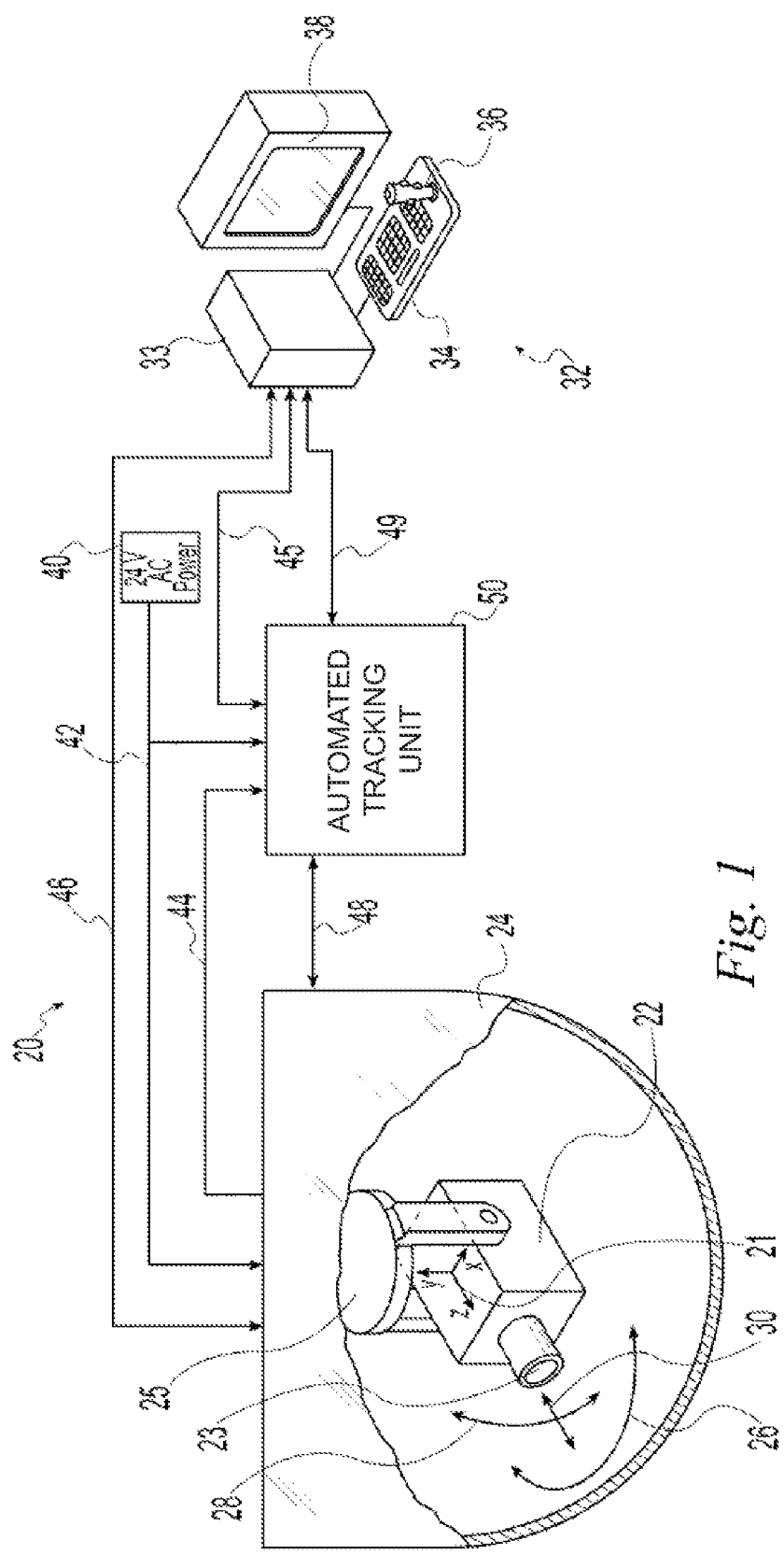
FIG. 1 is a schematic view of a video surveillance system in accordance with the present invention.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE DRAWINGS

In accordance with the present invention, a video surveillance system 20 is shown in FIG. 1. System 20 includes a camera 22 which is located within a partially spherical enclosure 24. Enclosure 24 is tinted to allow the camera to acquire images of the environment outside of enclosure 24 and simultaneously prevent individuals in the environment being observed by camera 22 from determining the orientation of camera 22. Camera 22 includes a controller and motors which provide for the panning, tilting and adjustment of the focal length of camera 22. Panning movement of camera 22 is represented by arrow 26, tilting movement of camera 22 is represented by arrow 28 and the changing of the focal length of the lens 23 of camera 22, i.e., zooming, is represented by arrow 30. As shown with reference to coordinate system 21, panning motion may track movement along the x axis, titling motion may track movement along the y-axis and focal length adjustment may be used to track movement along the z-axis. In the illustrated embodiment, camera 22 and enclosure 24 are a Phillips AutoDome® Camera Systems brand camera system, such as the G3 Basic AutoDome® camera and enclosure, which are available from Bosch Security Systems, Inc. formerly Phillips Communication, Security & Imaging, Inc. having a place of business in Lancaster, Pa. A camera suited for use with present invention is described by Sergeant et al. in U.S. Pat. No. 5,627,616 entitled Surveillance Camera System which is hereby incorporated herein by reference.

System 20 also includes a head end unit 32. Head end unit 32 may include a video switcher or a video multiplexer (not shown). For example, the head end unit may include an Allegiant brand video switcher available from Bosch Security Systems, Inc. formerly Phillips Communication, Security & Imaging, Inc. of Lancaster, Pa. such as a LTC 8500 Series Allegiant Video Switcher which provides inputs for up to 64 cameras and may also be provided with eight independent keyboards and 8 monitors. Head end unit 32 includes a keyboard 34 and joystick 36 for operator input and a display device 38 for viewing by the operator. A 24 volt a/c power source is provided to power both camera 22 and an automated tracking unit 50.

Illustrated system 20 is a single camera application, however, the present invention may be used within a larger surveillance system having additional cameras which may be either stationary or moveable cameras or some combination thereof to provide coverage of a larger or more complex surveillance area. One or more VCRs may also be connected to head end unit 32 to provide for the recording of the video images captured by camera 22 and other cameras in the system.

Figure 2:
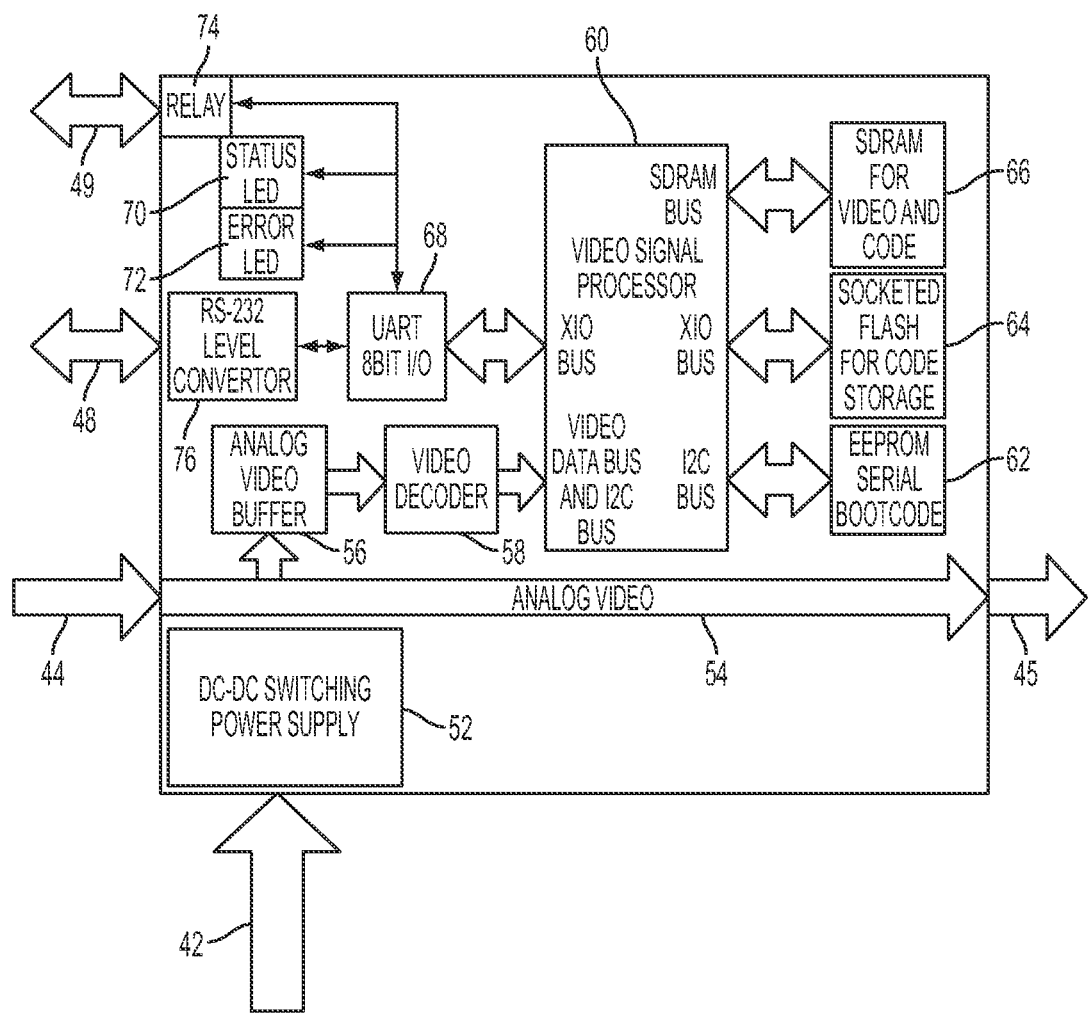
FIG. 2 is a schematic view of the automated tracking unit.

The hardware architecture of tracking unit 50 is schematically represented in FIG. 2. A power line 42 connects power source 40 to converter 52 to power tracking unit 50. Tracking unit 50 receives a video feed from camera 22 via video line 44 and video line 45 is used to communicate video images to head end unit 32. In the illustrated embodiment, video lines 44, 45 are coaxial, 75 ohm, 1 Vp-p and include BNC connectors for engagement with tracking unit 50. The video images provided by camera 22 are analog and may conform to either NTSC or PAL standards. When tracking unit 50 is inactive, i.e., turned off, video images from camera 22 pass through tracking unit 50 to head end unit 32 as shown by analog video line 54. A MOFSET based circuit provides a video input buffer 56 and video decoder 58 performs video decoding and passes the digitized video images to processor 60. In the illustrated embodiment, video input is no greater than 1 Vp-p and if the video signal exceeds 1 Vp-p it will be clipped to 1 Vp-p. Video processing is performed by processor 60 running software which is described in greater detail below. Processor 60 may be a TriMedia TM-1300 programmable media processor available from Phillips Electronics North America Corporation. At start up, processor 60 loads a bootloader program from serial EEPROM 62. The boot program then copies the application code from flash memory 64 to SDRAM 66 for execution. In the illustrated embodiment, flash memory 64 provides 1 megabyte of memory and SDRAM 66 provides 8 megabytes of memory. Since the application code from flash memory 64 is loaded on SDRAM 66 upon start up, SDRAM is left with approximately 7 megabytes of memory for video frame storage.

As shown in FIG. 2, a video data bus and I2C bus connects processor 60 with video decoder 58, a I2C bus connects processor 60 with EEPROM 62, a XIO bus connects processor 60 with flash memory 64, a SDRAM bus connects processor 60 with SDRAM 66 and a XIO bus connects processor 60 with UART 68. UART 68 is used for serial communications and general purpose input/output. UART 68 has a 16 character FIFO buffer, a 6 bit input port and an 8-bit output port that is used to drive status LED 70, error LED 72 and output relay 74 through the use of small signal transistors. Relay line 49 communicates the status of double pole, single throw relay 74 to head end unit 32. A RS-232 level convertor 76 provides communication between UART 68 and RS-232 serial line 48. The characteristics of RS-232 line 48 and the communications conveyed thereby in the illustrated embodiment are a 3 wire connection, 19200 baud, 8 data bits, no parity, 1 stop bit and no handshaking.

In the illustrated embodiment, the only commands conveyed to tracking unit 50 which are input by a human operator are on/off commands. Such on/off commands and other serial communications between head unit 34 and tracking unit 50 are conveyed by bi-phase line 46 from head unit 34 to camera 22 and to tracking unit 50 from camera 22 via RS-232 line 48. In the illustrated embodiment, tracking unit 50 is provided with a sheet metal housing and mounted proximate camera 22. Alternative hardware architecture may also be employed with tracking unit 50. Such hardware should be capable of running the software described below and processing at least approximately 5 frames per second for best results.

Tracking unit 50 performs several functions, it controls video decoder 58 and captures video frames acquired by camera 22; it registers video frames taken at different times to remove the effects of camera motion; it performs a video content analysis to detect target objects which are in motion within the FOV of camera 22; it calculates the relative direction, speed and size of the detected target objects; it sends direction and speed commands to camera 22; it performs all serial communications associated with the above functions; and it controls the operation of the status indicators 70, 72 and relay 74.

The operation of system 20 will now be described in greater detail. When tracking unit 50 is first activated the first step involves initializing camera 22 and positioning camera 22 to watching for a person or moving object to enter the FOV of camera 22 by taking repeated images as 24-bit YUV color images as either NTSC or PAL CIF resolution images. Alternatively, camera 22 may be moved through a predefined "tour" of the surveillance area after initialization and watch for a person or other moving object to enter the FOV of camera 22 as camera 22 searches the surveillance area. For reference purposes, two images or frames acquired by camera 22 for analysis will be labeled:

$$I_1, I_2$$

In the exemplary embodiment, camera 22 is continually acquiring new images and the computational analysis performed by processor 60 to compare the current image with a reference image takes longer than the time interval between the individual images acquired by camera 22. When processor 60 completes its analysis, it will grab a new image for analysis. The time interval between two images which are consecutively grabbed by processor 60 is assumed to be constant by illustrated tracking unit 50. Although the time interval between two consecutively grabbed images may differ slightly, the variations are considered sufficiently small and the processing efficiencies achieved by this assumption to be sufficiently great to justify this assumption. As used herein unless otherwise indicated, the term consecutive images refers to images which are consecutively grabbed by processor 60 for analysis as opposed to images which are consecutively acquired by camera 22. A QCIF resolution sub-sample (i.e., an image having a quarter of the resolution of the NTSC or PAL CIF resolution image) of the current $I_1$ and $I_2$ images is created. The sub-sample groups adjacent pixels together to define an average value for the grouped pixels. The purpose of the sub-sampling process is to reduce the time consumed by motion detection. A second sub-sample of the first sub-sample (resulting in images having ¹⁄₁₆ the resolution of the original CIF resolution images) may also be taken to further increase the speed of the motion detection process. Such sub-sampling, however, reduces the resolution of the images and can potentially degrade the ability of system to detect the features and targets which are the subjects of interest. For reference purposes these sub-sampled images are labeled:

$$I_1^1, I_1^2, I_2^1, I_2^2$$

If only a single sub-sample of each image is taken, these sub-samples are labeled:

$$I_1^1, I_2^1$$

Alternatively, these subsamples may be labeled $^1I_1$ and $^1I_2$.

Target Object Detection

Initially, the camera may be stationary and monitoring a specific location for a moving target object. System 20 looks for a moving target object by computing the image difference between the two most current images every time a new frame is grabbed by processor 60. The image difference is calculated by taking the absolute value of the difference between associated pixels of each image. When images $I_1$ and $I_2$ are aligned, either because camera 22 took each image with the same FOV or because one of the images was mapped to the second image, the image difference, $\Delta$, is calculated in accordance with the following equation:

$$\Delta = |I_2 - I_1|$$

A histogram of these differences is then calculated. If there is a moving target in the two images, the histogram will usually have two peaks associated with it. The largest peak will typically be centered around zero and corresponds to the static regions of the image. The second major peak represents the pixels where changes in image intensity are high and corresponds to the moving areas within the image, i.e., a moving target object. The pixels associated with the second peak can be considered as outliers to the original Gaussian distribution. Since they will typically constitute less than 50% of the total number of pixels in the illustrated embodiment, they are detected using the estimation technique Least Median of Squares.

An alternative method that may be used with the present invention and which provides for the manual identification of a target object for tracking purposes is discussed by Trajkovic et al. in U.S. Pat. App. Pub. 2002/0140813 A1 entitled Method For Selecting A Target In An Automated Video Tracking System which is hereby incorporated herein by reference. A method for detecting motion of target objects that may be used with the present invention is discussed by Trajkovic in U.S. Pat. App. Pub. 2002/0168091 A1 entitled Motion Detection Via Image Alignment which is hereby incorporated herein by reference.

Identification of Point of Interest

After detecting motion, a point of interest (POI) corresponding to the centroid of the moving target object is then identified. By calculating the convolution with Sobel operators of arbitrary order, the Sobel edge detection masks look for edges in both the horizontal and vertical directions and then combines this information into a single metric as is known in the art. More specifically, at each pixel both the Sobel X and Sobel Y operator is used to generate a gradient value for that pixel. They are labeled gx and gy respectively. The edge magnitude is then calculated by equation (1):

$$\text{EdgeMagnitude} = \sqrt{gx^2 + gy^2} \quad (1)$$

The edge of the moving target object will have large edge magnitude values and these values are used to define the edges of the target object. The centroid of the target object or area of motion is found by using the median and sigma values of the areas of detected motion. The centroid, which is the point of interest or POI, is then found in both frames and its image position coordinates stored as (x(0), y(0), and x(1), y(1)).

Three related coordinate systems may be used to describe the position of the POI, its real world coordinates (X, Y, Z) corresponding to coordinate system 21 shown in FIG. 1, its image projection coordinates (x, y) and its camera coordinates ($\alpha$, $\beta$, k) which correspond to the camera pan angle, camera tilt angle and the linear distance to the POI. The two positions of the POI captured by the two images allow for the determination of the 3-D position of the POI in both frames as well as the relative velocity of the POI during the time interval between the two frames. A simplified representation of the moving person or target object in the form of the 2-D location in the image is used in this determination process.

Tracking unit 50 does not require the two images which are used to determine the motion of the POI to be taken with the camera having the same pan, tilt and focal length settings for each image. Instead, tracking unit 50 maps or aligns one of the images with the other image and then determines the relative velocity and direction of movement of the POI. Two alternative methods of determining the velocity and direction of the POI motion are described below. The first method described below involves the use of a rotation matrix R while the second method uses a homography matrix determined by matching and aligning common stationary features which are found in each of the two images being analyzed.

Rotation Matrix Method

When camera 22 is pointing in a direction determined by pan and tilt angles $\alpha$ and $\beta$ respectively, the rotation matrix, R, determined by these angles is given by:

$$R = \begin{bmatrix} 1 & 0 & 0 \\ 0 & \cos\alpha & -\sin\alpha \\ 0 & \sin\alpha & \cos\alpha \end{bmatrix} \begin{bmatrix} \cos\beta & 0 & \sin\beta \\ 0 & 1 & 0 \\ -\sin\beta & 0 & \cos\beta \end{bmatrix} \quad (2)$$

$$= \begin{bmatrix} \cos\beta & 0 & \sin\beta \\ \sin\alpha\sin\beta & \cos\alpha & -\sin\alpha\cos\beta \\ -\cos\alpha\sin\beta & \sin\alpha & \cos\alpha\cos\beta \end{bmatrix}$$

$$= \begin{bmatrix} r_1^T \\ r_2^T \\ r_3^T \end{bmatrix}$$

For an arbitrary point having image projection coordinates (x, y), the relation between the world coordinates, $P_w$, of an arbitrary point P and its camera coordinates, $P_c$, is given as:

$$P_w = R P_c$$

and the relation between the world coordinates and the image projection coordinates (x, y) is given by:

$$x = f \frac{r_1^T P_w}{r_3^T P_w} + x_0$$

$$y = f \frac{r_2^T P_w}{r_3^T P_w} + y_o$$

wherein f is the focal length of the camera, (x, y) are the current image projection coordinates of the POI, and ($x_0$, $y_0$) are the previous image projection coordinates of the POI. Using the above equations:

$$x(0) = \frac{r_1^T P_w}{r_3^T P_w} + x_0 \Rightarrow r_3^T P(0)(x(0) - x_0) = f r_1^T P(0) \quad (3a)$$

$$y(0) = \frac{r_2^T P_w}{r_3^T P_w} + y_0 \Rightarrow r_3^T P(0)(y(0) - y_0) = f r_2^T P(0) \quad (3b)$$

Assuming the target object to be a person of average height, the height can be considered a constant (i.e., Z(0)=Z=Constant) and equations (3a) and (3b) will represent a linear system with two unknowns (X(0), Y(0)) which is easily solved. The position of the POI in the second image, (X(1), Y(1)), can be computed in a similar manner, and the real world velocity of the target object in the x and y directions, X' and Y' respectively, can be found by:

$$X' = X(1) - X(0) \quad (3c)$$

$$Y' = Y(1) - (0) \quad (3d)$$

Although the values for X' and Y' obtained in accordance with equations (3c) and (3d) are literally distances, the time interval between consecutive images grabbed by processor 60 will be substantially constant as discussed above and, thus, the distance traveled by the target object during all such constant time intervals is directly proportional to the velocity of the target object and may be used as a proxy for the average velocity of the target object during the time interval between the acquisition of the two images. The sign of the velocity values is indicative of the direction of motion of the POI. In alternative embodiments, the actual velocity may be calculated and/or images acquired at more varied time intervals may be used. With this knowledge of the velocity and direction of motion of the POI, the pan and tilt velocity of camera 22 can be controlled to keep the target object centered within the FOV of camera 22.

In one embodiment, camera control also includes adjusting the focal length based upon the calculated distance between camera 22 and the centroid of the target object, i.e., the POI. The destination focal length is assumed to be proportional to the distance between the POI and the camera, this distance, i.e., D(k), is found by the following equation:

$$D(k) = \|P_w(k)\| = \sqrt{X(k)^2 + Y(k)^2 + Z^2}$$

wherein:
$P_w(k)$ represents the three dimensional location of the point in the world coordinate system;
$X(k)$ is the distance of the POI from the focal point of the camera in the X direction in the real world;
$Y(k)$ is the distance of the POI from the focal point of the camera in the Y direction in the real world; and
Z is the current focal length of the camera, i.e., the distance between the camera and the focal plane defined by the current zoom setting.

It is desired to keep this distance expressed as focal length units by use of the following:

$$D(k) = cf(k)$$

wherein:
$f(k)$ is the focal length of the camera at time step k; and
c is a constant.
The focal length at each time step is computed using $$f(k) = \frac{D(k)}{c}$$

With the current image projection of the POI given by $(x_c, y_c)$, then it holds $$x_c = f\frac{X_c}{Z_c} + x_0, \; y_c = f\frac{Y_c}{Z_c} + y_c \Rightarrow \frac{X_c}{Z_c} \quad (4)$$

$$= \frac{x_c - x_0}{f}$$

$$= x_{cn}, \frac{Y_c}{Z_c}$$

$$= \frac{y_c - y_0}{f}$$

$$= y_{cn}$$

wherein:
$X_c$, $Y_c$ and $Z_c$ are the current real world coordinates of the POI; and $x_{cn}$ and $y_{cn}$ are the horizontal and vertical distances respectively of between the center of the image and the current image coordinates of the POI.

To achieve the desired or destination position of camera 22, it may also be necessary to rotate the camera about its pan and tilt axes. The rotation matrix given by equation 2 may be used to compute the desired position as follows:

$$x_d = f\frac{r_1^T P_c}{r_3^T P_c} + x_0$$

$$y_d = f\frac{r_2^T P_c}{r_3^T P_c} + y_0$$

wherein $x_d$ and $y_d$ are the destination image coordinates of the POI.
or equivalently:

$$x_{dn} = \frac{x_d - x_0}{f} = \frac{r_1^T P_c}{r_3^T P_c} \quad (5)$$

$$y_{dn} = \frac{y_d - y_0}{f} = \frac{r_2^T P_c}{r_3^T P_c}$$

wherein $x_{dn}$ and $y_{dn}$ are the respective horizontal and vertical distances separating the two points $(x_0, y_0)$ from $(x_d, y_d)$.
Combining equation (4) with equation (5) provides:

$$P_c = [X_c \; Y_c \; Z_c]^T$$

$$= \left[\frac{X_c}{Z_c} \; \frac{Y_c}{Z_c} \; 1\right]^T Z_c$$

$$= [x_{cn} \; y_{cn} \; 1]^T Z_c$$

$$= Z_c P_{cn}^T,$$

After expansion, this equation may be written as:

$$x_{cn} \cos\beta + \sin\beta = x_{dn}(-x_{cn} \cos\alpha \sin\beta + y_{cn} \sin\alpha + \cos\alpha \cos\beta)$$

$$x_{cn} \sin\alpha \sin\beta + y_{cn} \cos\alpha - \sin\alpha \cos\beta = y_{dn}(-x_{cn} \cos\alpha \sin\beta + y_{cn} \sin\alpha + \cos\alpha \cos\beta)$$

wherein $x_{cn}$ and $y_{cn}$ are the camera coordinate equivalents of $x_{dn}$ and $y_{dn}$. The angles of rotation can then be found by iteratively solving this equation. The angles determined by this process represent the movement of the target object between the two consecutive images, $I_1$ and $I_2$, previously analyzed. As discussed above, the time interval between two such consecutive images is a substantially constant value and thus the angles determined by this process are target values which are a function of the velocity of the target object in the time interval between the acquisition of the two images. The determined angles are also a function of the original location of the target object relative to the camera, the acceleration of the object and the previous orientation of the camera.

Homography Matrix Method

An alternative method of determining a target value which may be used in the control of camera 22 to track the target object and which is representative of a property of the target object involves detecting corners in images $I_1$ and $I_2$. Corners are image points that have an intensity which significantly differs from neighboring points. Various methods of identifying and matching such corners from two images are known in the art.

One such known corner detection method is the MIC (minimum intensity change) corner detection method. The MIC corner detection method uses a corner response function (CRF) that gives a numerical value for the corner strength at a given pixel location. The CRF is computed over the image and corners are detected as points where the CRF achieves a local maximum. The CRF is computed using the following equation:

$$R = \min(r_A, r_B)$$

wherein:
R is the CRF value;
$r_A$ is the horizontal intensity variation; and
$r_B$ is the vertical intensity variation.

The MIC method uses a three step process wherein the first step involves computing the CRF for each pixel in a low resolution image. Pixels having a CRF above a first threshold $T_1$ are identified as potential corners. This initial step will efficiently rule out a significant area of the image as non-corners because the low resolution of the image limits the number of pixels which require the computation of the CRF. The second step involves computing the CRF for the potential corner pixels using the full resolution image. If the resulting CRF is below a second threshold, $T_2$, the pixel is not a corner. For pixels which have a CRF which satisfies the second threshold, $T_2$, another interpixel approximation for determining an intensity variation for the pixel may also be computed and compared to a threshold value, e.g., $T_2$. If the response is below the threshold value, the pixel is not a corner. The third step involves locating pixels having locally maximal CRF values and labeling them corners. Nearby pixels having relatively high CFR values but which are not the local maximal value will not be labeled corners. Lists, PCL1 and PCL2, of the detected corners for images $I_1$ and $I_2$ respectively are then compiled and compared. The corners in the two images are compared/matched using a similarity measure such as a normalized cross-correlation (NCC) coefficient as is known in the art.

When camera 22 is adjusted between the acquisition of the two images $I_1$ and $I_2$, it is necessary, to detect the target object in the most recently acquired image, to align the images so that the background remains constant and that only objects displaying motion relative to the background are detected. The adjustment of camera 22 may take the form of panning movement, tilting movement or adjustment of the focal length of camera 22. Geometric transforms may be used to modify the position of each pixel within the image. Another way to think of this is as the moving of all pixels from one location to a new location based upon the camera motion. One such method for transforming a first image to align it with a second image wherein the camera was adjusted between the acquisition of the two images is discussed by Trajkovic in U.S. Pat. App. Pub. No. 2002/0167537 A1 entitled Motion-Based Tracking With Pan-Tilt-Zoom Camera which is hereby incorporated herein by reference.

Alignment of consecutive images requires translation, scaling and rotation of one image to align it with the previous image(s). Of these three operations translation is the simplest. Warping, a process in which each pixel is subjected to a general user-specified transformation, may be necessary to reduce, expand, or modify an image to a standard size before further processing can be performed. Images produced by such geometric operations are approximations of the original. The mapping between the two images, the current $I_1$ and a reference $I_2$ images is defined by:

$$\dot{p} = sQRQ^{-1}p = Mp \qquad (6)$$

where p and p' denote the homographic image coordinates of the same world point in the first and second images, s denotes the scale image (which corresponds to the focal length of the camera), Q is the internal camera calibration matrix, and R is the rotation matrix between the two camera locations.

Alternatively, the relationship between the image projection coordinates p and p', i.e., pixel locations (x, y) and (x', y'), of a stationary world point in two consecutive images may be written as:

$$x' = \frac{m_{11}x + m_{12}y + m_{13}}{m_{31}x + m_{32}y + m_{33}} \qquad (7a)$$

$$y' = \frac{m_{21}x + m_{22}y + m_{23}}{m_{31}x + m_{32}y + m_{33}} \qquad (7b)$$

Where $\lfloor m_{ij} \rfloor_{3 \times 3}$ is the homography matrix M that maps (aligns) the first image to the second image.

The main problem of image alignment, therefore, is to determine the matrix M. From equation (6), it is clear that given s, Q and R it is theoretically straightforward to determine matrix M. In practice, however, the exact values of s, Q, and R are generally not known. Equation (6) assumes that the camera center and the center of rotation are identical, which is typically only approximately true. Additionally, in order to retrieve precise values of camera settings, i.e., pan and tilt values for determining R and zoom values for determining s, the camera must stop which will create unnatural motion and, depending on the system retrieving the camera settings, may take a considerable length of time.

The exemplary embodiment of the present invention computes the alignment matrix M directly from the images using equations (7a) and (7b) to avoid the necessity of acquiring information on the camera position and calibration. The point matches between the two images is performed by first taking a QCIF sub-sample of the two images $I_1$ and $I_2$ to obtain:

$$I_1^1, I_2^1$$

It is also possible to take a further QCIF sub-sample of the sub-sampled images to provide the following set of lower resolution images:

$$I_1^1, I_1^2, I_2^1, I_2^2$$

The corners are then found in the low resolution images using the MIC corner detector described above. The homography matrix is then computed based upon a plurality of corresponding coordinates (x, y) and (x', y') in the low resolution image. Corner matching is then performed on the higher resolution image by finding the best corners around positions predicted by the homography matrix calculated using the low resolution images. A robust method such as the RANSAC algorithm which is known in the art may be used with the higher resolution images to identify "outlier" corner points which likely correspond to moving objects within the image. The "outlier" corner points identified by the RANSAC algorithm are not used in the calculation of the homography matrix using the higher resolution images to avoid the bias which would be introduced by using moving points in the calculation of the homography matrix. After removing the "outlier" corners using the RANSAC algorithm, the higher resolution images are used to the calculate the homography matrix M.

The translation, rotation, and scaling of one image to align it with the second image can then be performed. A translation is a pixel motion in the x or y direction by some number of pixels. Positive translations are in the direction of increasing row or column index: negative ones are the opposite. A translation in the positive direction adds rows or columns to the top or left to the image until the required increase has been achieved. Image rotation is performed relative to an origin, defined to be at the center of the motion and specified as an angle. Scaling an image means making it bigger or smaller by a specified factor. The following approximation of equations (7a) and (7b) are used to represent such translation, rotation and scaling:

$$\dot{x}' = s(x \cos \alpha - y \sin \alpha) + t_x,$$

$$\dot{y}' = s(y \sin \alpha + x \cos \alpha) + t_y \quad (8)$$

wherein
s is the scaling (zooming) factor.
$\alpha$ is the angle of rotation about the origin;
$t_x$ is the translation in the x direction; and
$t_y$ is the translation in the y direction.
By introducing new independent variables $a_1 = s \cos \alpha$ and $a_2 = s \sin \alpha$, equation (8) becomes:

$$\dot{x} = a_1 x - a_2 y + t_x$$

$$\dot{y} = a_2 x + a_1 y + t_y$$

After determining $a_1$, $a_2$, $t_x$ and $t_y$, the two images, $I_1$ and $I_2$, can be aligned and the determination of the velocity and direction of the target object motion can be completed.

To create smooth camera motion camera 22 is controlled in a manner which allows camera 22 to be constantly in motion. If the POI is to the left of the center of the field of view processor 60 communicates a command to camera 22 which instructs camera 22 to pan left at a particular panning velocity or rate of adjustment. The panning velocity is determined by the distance the POI is from the center of the image. There is a linear relationship between the selected panning velocity and the distance between the center of the most recently acquired image and the POI in the horizontal or x direction. Similarly, the tilting rate and direction of camera 22 is determined by the vertical distance, i.e., in the y direction, between the POI and the center of the most recently acquired image. Proportionality factors are also applied to account for distance of the target object from the camera.

The distance of the target object from the camera also influences the desired panning velocity. For a target object moving at a given speed in the x direction, the panning angle will have to be adjusted at a slower rate to track the object the more distant the object is from the camera. The distance of the target object from the camera also impacts the desired value of the camera tilt and focal length. Assuming a common height for all target objects and that the target object are moving on a planar surface which is parallel to the panning plane, the tilt angle which places the target object in the center of the image will be determined by the distance of that object from the camera, similarly, to maintain the target object at a given image height and assuming all target objects are the same height, the desired focal length of the camera will be determined by the distance of the target object from the camera.

In the exemplary embodiment, the panning and tilting velocity of camera 22 are determined by the following equations:

$$X_{vel} = (x_{delta}/x_{high}) * \sin(\text{tilt angle})$$

$$Y_{vel} = (y_{delta}/y_{high}) * \sin(\text{tilt angle})$$

wherein:
$X_{vel}$ is the velocity or rate at which the panning angle is adjusted;
$Y_{vel}$ is the velocity or rate at which the tilting angle is adjusted;
$x_{delta}$ is the distance between the POI and the center of the image in the x direction;
$y_{delta}$ is the distance between the POI and the center of the image in the y direction;
$x_{high}$ and $y_{high}$ are normalization factors; and sin(tilt angle) is the sine of the camera tilt angle (measured with reference to a horizontal plane) and provides a proportionality factor which is used to account for the target object distance from the camera. The resulting values $X_{vel}$ and $Y_{vel}$ are computed using the distance of the POI from the center of the image and the distance of the target object from the camera and, as described above, the distance of the POI from the center of the image is related to the movement of the target object over a constant time value, thus values $X_{vel}$ and $V_{vel}$ are a function of several properties of the target object, its position relative to the camera in the real world and the position of the target object centroid within the FOV which is a function of the velocity and acceleration of the target object and thus, values $X_{vel}$ and $Y_{vel}$ are also functions of the velocity and acceleration of the target object.

A proportionality factor which is a function of the distance of the target object from the camera is used to adjust the selected panning and tilting adjustment rates because this distance impacts the effects of the panning and tilting adjustment of the camera. With regard to the panning motion of the camera, for example, when the target object is distant from the camera only minimal panning movement will be required to track movement of the target object in the x direction and maintain the target in the center of the image. If the target object is closer to the camera, the camera will be required to pan more quickly to track the target object if it were to move at the same speed in the x direction. Similarly, a higher rate of tilting is required to track targets which are closer to the camera than those which are more distant when such targets are moving at the same speed.

Additionally, the focal length adjustment rate and direction, i.e., how quickly to zoom camera 22 and whether to zoom in or out, is determined using the distance of the target object from the camera. The process described above for aligning two images having different scales, i.e., acquired at different focal lengths, allows for system 20 to utilize dynamic zooming, i.e., adjusting the focal length of camera 22 during the tracking of the target object instead of requiring the camera to maintain a constant zoom or focal length value during tracking or for acquiring compared images. In the exemplary embodiment, the largest detected moving object is selected as the target object provided that the size of the target object is larger than a predetermined threshold value, e.g., 10% of the field of view. Once tracking of the target object begins, the focal length of camera 22 is adjusted in a manner which attempts to maintain the target object between 10%-70% of the FOV. Tracking of the target may stop if the size of the object falls outside of this range. The focal length of camera 22 is adjusted to account for the distance of the target object from the camera with the goal of keeping the target object size relatively constant, e.g., 20% of the FOV, and which facilitates the observation of the target object.

More specifically, the desired focal length is determined by first estimating the target distance between the target object and the camera as follows:

Target Distance=Camera Height/Sin(tilt angle)

wherein the tilt angle is determined with reference to a horizontal plane. Camera 22 is mounted at a known height and this height is input into tracking unit 50 during installation of system 20. Next, the resolution-limited FOV width (R-L FOV width) is calculated:

R-L FOV width=Number of effective pixels/Number of lines of resolution required to identify an intruder wherein:
Number of effective pixels is 768(H) for NTSC video images and 752(H) for PAL video images; and
Number of lines of resolution to identify an intruder is in lines of resolution per foot, in the exemplary embodiment, e.g., 16 lines per foot.
Then a desired focal length is calculated which will provide a sufficient number of lines of resolution to continue tracking of the target object is calculated:

Desired Focal Length=Format*Target Distance (ft)/R-L FOV width wherein:
Format is the horizontal width in mm of the CCD (charge-coupled device) used by the camera, e.g., 3.6 mm for camera 22. In the illustrated embodiment, camera 22 is instructed to adjust its focal length setting by changing the focal length to the desired focal length value. The focal length adjustment of camera 22 is thus a point-to-point adjustment of the focal length. It would be possible in an alternative embodiment, however, for camera 22 to be commanded to move at a selected adjustment rate which is selected based upon the difference between the current focal length and the desired focal length similar to the manner in which the pan and tilt adjustments are made rather than to simply move to a given zoom setting. Camera 22 would then continue to the adjust the focal length at the specified rate (and in the chosen direction, i.e., increasing or decreasing the focal length of the camera) until processor 60 communicated a second command altering the rate or direction of focal length adjustment. Such a second command could be to change the rate of change to 0 which would correspond to a constant focal length value.

In summary, the video content analysis algorithm performs the following functions:
Tracker Initialization: The tracker is initialized to position the camera and wait for a moving target object to enter the camera FOV.
Background Subtraction: Images are compared to subtract the background and detect moving target objects.
Corner Detection and Matching: Corner features in the background are identified and matched to estimate changes in camera position between acquisition of the images.
Warping: Images are geometrically distorted to align images taken with differing fields of view and detect the moving target object in such images.
Region Location and Extraction: Locating the target object in each new frame involves locating and extracting the image region corresponding to the target object.
Point of Interest (POI) Computation: A simplified representation of the target object and its centroid is located within the two dimensional framework of the image.
Calculate adjustment rates for PTZ camera: Determine pan, tilt and focal length adjustment rates for camera and communicate commands to the camera.

Figure 3:
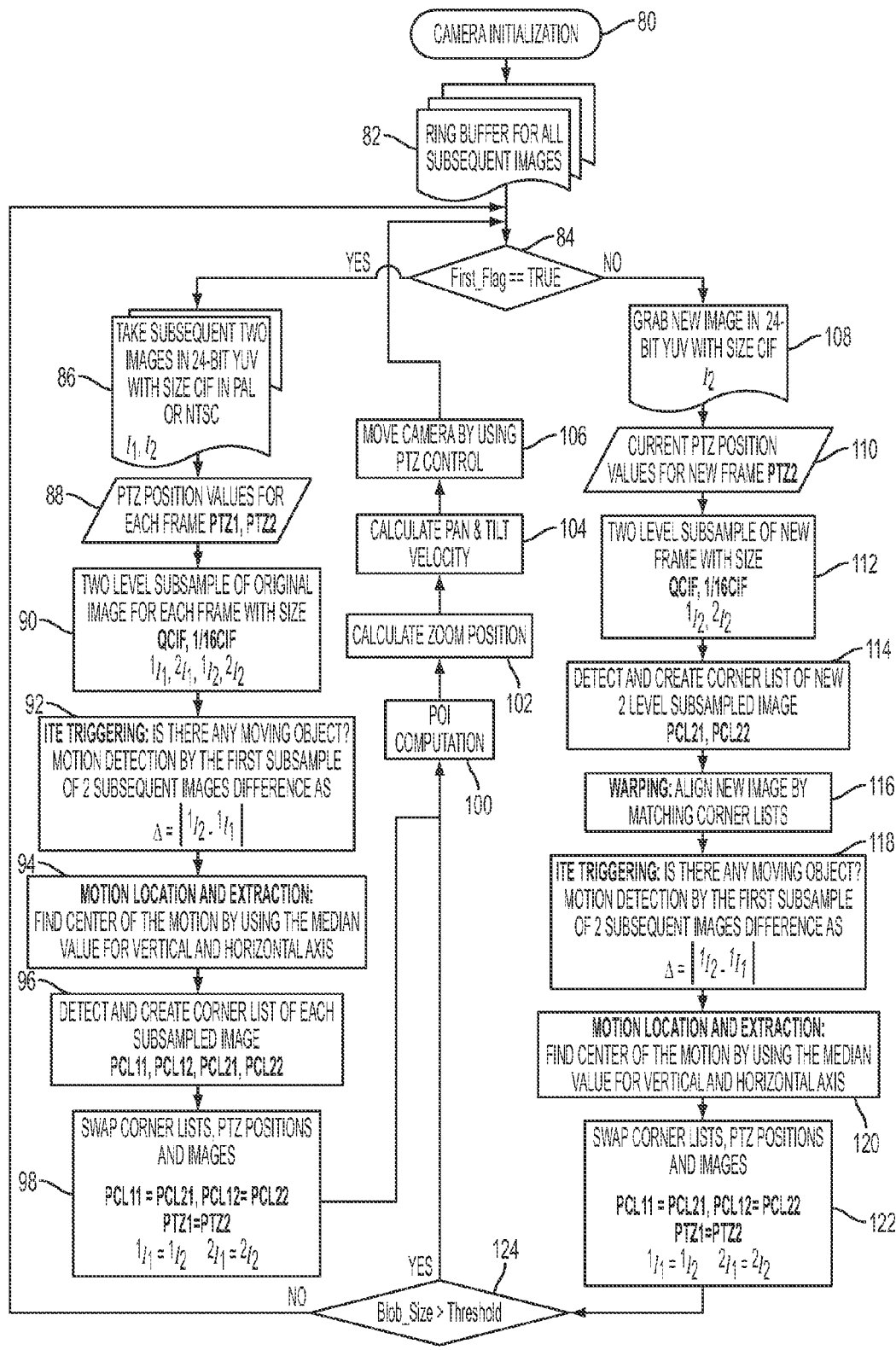
FIG. 3 is a flowchart representing the operation of the video surveillance system.

FIG. 3 provides a flow chart which graphically illustrates the general logic of the video content analysis algorithm used by system 20 as described above and which uses the homography matrix approach instead of the rotation matrix approach to identify and track the target object. As shown in FIG. 3, after turning tracking unit 50 on, it is initialized at step 80 by loading a bootloader program from EEPROM 62 and copying the application code from flash memory 64 to SDRAM 66 for execution. Block 82 represents the remaining memory of SDRAM 66 which is available as a ring buffer for storage of video image frames for processing by processor 60. At decision block 84 processor 60 determines if the first flag is true. The first flag is true only when no images from camera 22 have been loaded to SDRAM 66 for analysis by processor 60. Thus, when tracking unit 50 is turned on, the first time decision block 84 is encountered, the first flag will be true and processor 60 will proceed to block 86. Block 86 represents the grabbing of two images by processor 60. Processor 60 then proceeds to block 88 where the current tilt value of camera 22 for each of the two images are obtained from the integral controller of camera 22 for later use to calculate the destination focal length.

Next, block 90 represents the taking of subsamples of the two most recently grabbed images. At block 92, the image difference of the two subsampled images is calculated to determine if any moving objects are present in the images. (If a moving object is found then the intruder tracking functionality of unit 50 is engaged, i.e., ITE Triggering.) If a moving object is present in the images, the centroid of the moving target object is located at block 94. A corner detection method is then used to detect corner features in the subsampled images and generate lists of such corners at block 96. Next, at block 98, the data for images $I_1$ and $I_2$ are swapped. The swapping of image data is done so that when a new image is grabbed and placed in the buffer after completing the calculations called for in steps 100-104 the new image and data associated therewith will overwrite the image and data associated with the older of the two images already present in the buffer. At block 100 the POI is calculated using the highest resolution images if the POI was determined using subsample images at block 94. The destination or desired focal length is then calculated at block 102. The pan and tilt velocity, $X_{vel}$ and $Y_{vel}$ are calculated at block 104. Next, at block 106, processor 60 communicates a command to camera 22 to adjust the focal length to the desired focal length; to pan at an adjustment rate and direction corresponding to the magnitude and sign of $X_{vel}$; and to tilt at an adjustment rate and direction corresponding to the magnitude and sign of $Y_{vel}$.

The process then returns to block 84 where the first flag will no longer be true and the process will proceed to block 108 where a single new image will be grabbed and overwrite image $I_2$ in the buffer. The tilt value of camera 22 for new image $I_2$ is then obtained at block 110 from the integral controller of camera 22 for later calculation of the desired focal length. The new image is then subsampled at block 112 and corners are detected and a list of such corners created for the subsampled images at block 114. The warping and alignment process described above is then performed at block 116 to align images $I_1$ and $I_2$. At block 118, the image difference of the two aligned images is then calculated to determine if a moving object is included in the images. If a moving target object is present in the images, the centroid of the target object is determined at block 120. At block 122 images I₁ and I₂ and the data associated therewith are swapped as described above with respect to block 98. At block 124 the size of the detected target object, i.e., the Blob_Size, is compared to a threshold value and, if the target object is not large enough, or if no target object has been found in the images, the process returns to block 84. If the target object is larger than the threshold size, the process continues on to block 100 through 106 where the adjustment parameters of camera 22 are determined and then communicated to camera 22 as described above.

In the illustrated embodiment, camera 22 may pan and tilt at different specified velocities, i.e., at selectively variable adjustment rates, and when processor 60 communicates a command to camera 22, processor 60 instructs camera 22 to pan in a selected direction and at a selected rate, to tilt in a selected direction and at a selected rate, and to change the focal length to a desired focal length. After receiving this first command, camera 22 will adjust by moving to the specified focal length and panning and tilting in the specified directions and at the specified rates until camera 22 receives a second command instructing it to pan in a new selected direction and at a new selected rate, to tilt in a new selected direction and at a new selected rate, and to change the focal length to a new desired focal length. The panning and tilting of camera 22 may also cease prior to receiving the second command if camera 22 has a limited panning or tilting range and reaches the limit of its panning or tilting range. By instructing camera 22 to pan and tilt in selected directions and at selected rates instead of instructing camera 22 to move to new pan and tilt orientations and then stop, camera 22 may be continuously adjusted during the tracking of the target object without stationary intervals separating the receipt and execution of the adjustment commands and thereby provide a stream of video images with relatively smooth transitional movements.

Thus, during operation of system 20, processor 60 may consecutively analyze a series of images which may all record different FOVs. As processor 60 analyzes images and repeatedly adjusts camera 22 to track the target object, the series of images may include three images consecutively analyzed by processor 60, i.e., first, second and third images, wherein each image records a different FOV. Processor 60 will have communicated a previous command to camera 22 based upon earlier images and camera 22 will be adjusted in accordance with this first command as it analyzes the first and second images, the analysis of the first and second images will result in a second command to camera 22 and camera 22 will be adjusted in accordance with this second command as it analyzes the second and third images to formulate the next adjustment command for camera 22. As described above, camera 22 will continue to pan and tilt in accordance with the first command until receipt of the second command. In this manner, camera 22 may be continuously adjusted as it acquires a series of images having different fields of views without requiring stationary intervals for the acquisition of images having common FOVs or separating the execution of adjustment commands.

The video content analysis algorithm described above assumes that camera 22 is mounted at a known height and works best when the surveillance area and target objects conform to several characteristics. For best results, the target should be 30% to 70% of the image height, have a height to width ratio of no more than 5:1 and move less than 25% of the image width between processed frames at a constant velocity. System 20 tracks only one moving target at a time. If multiple targets are within the FOV, system 20 will select the largest target if it is 20% larger than next largest target. If the largest target is not at least 20% larger than next largest target, system 20 may change targets randomly. Alternative target object identification methods may also be used to distinguish between moving objects, such as those analyzing the color histogram of the target object. It is best if the area of interest is within 1 standard deviation of the mean intensity of the surrounding environment. Best results are also obtained when the plane of the target motion is parallel to the panning plane. System 20 uses background features to detect "corners" and register subsequent images, therefore it may fail in excessively featureless environments or if targets occupy a majority of the FOV and obscure such corner features. Divergence from these assumptions and characteristics is not necessarily fatal to the operation of system 20 and may merely degrade performance of system 20. These assumptions concerning the illustrated embodiment cover a large subset of video surveillance applications related to restricted areas where people are not supposed to be present. It is also possible for those having ordinary skill in the art to adapt illustrated system 20 to cover additional situations which are not necessarily limited to these assumptions and characteristics.

Figure 4:
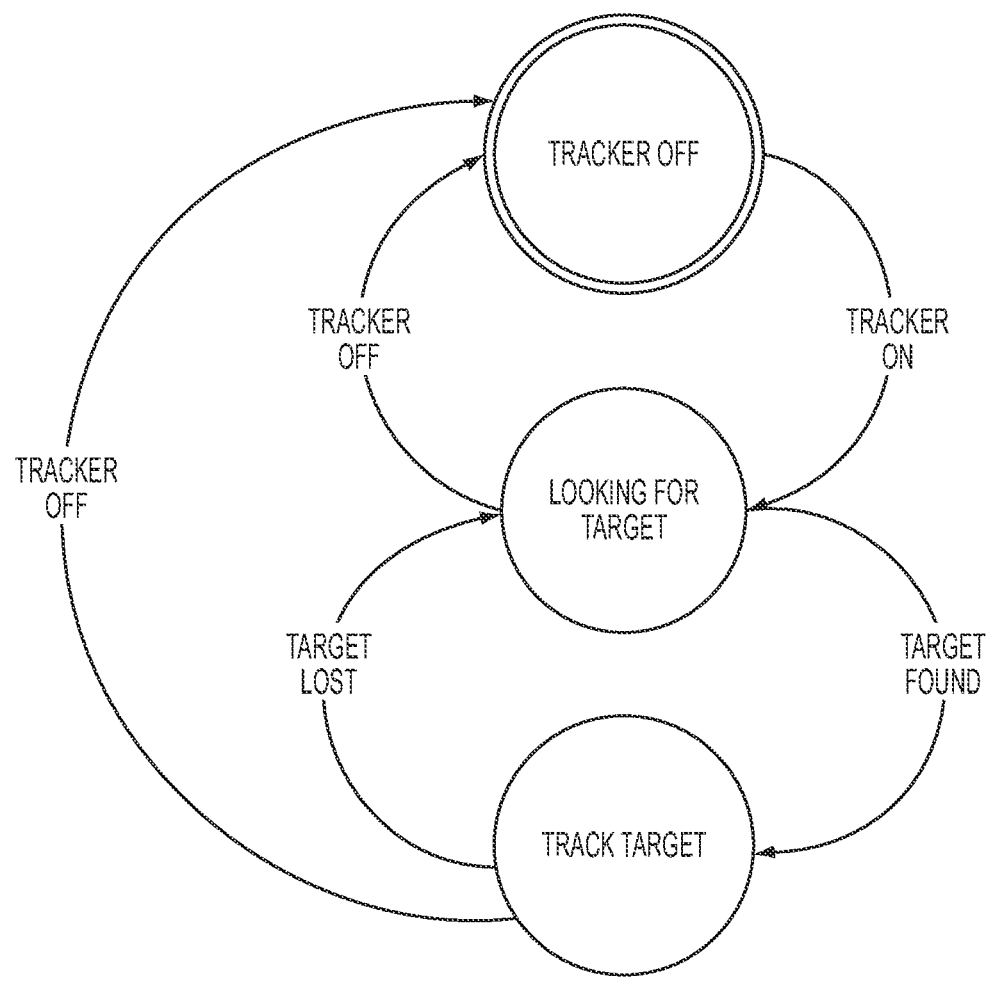
FIG. 4 is a flow chart representing the different status levels of the tracking unit.

As shown in FIG. 4, tracking unit 50 has three main states: 1) Tracker OFF, 2) Looking for Target and 3) Tracking Target. Tracking unit 50 is turned on and off by a human operator inputting commands through an input device such as keyboard 34 or joystick 36. The on/off commands are routed through bi-phase cable 46 to camera 22 and RS-232 line to tracking unit 50. Tracking unit 50 communicates its current status with LED indicators 70, 72 and relay 74. For example, LED 70 emits light when unit 50 is on and flashes when unit 50 is tracking a target object. When unit 50 is tracking a target object, relay 74 communicates this information to head end unit 34 via relay line 49. LED 72 emits light when unit 50 is turned on but has experienced an error such as the loss of the video signal.

In the exemplary embodiment, if tracking unit 50 is on, either looking for a target or tracking a target, and a higher priority activity is initiated, tracking unit 50 will turn off or become inactive and after the higher priority activity has ceased and a dwell time has elapsed, i.e., the higher priority activity has timed out, tracking unit 50 will turn back on and begin looking for a target.

| ACTIVITY | (PRIORITY RANKING) | TRACKING UNIT ACTION |
|---|---|---|
| Joy Stick Movement | (1) | Tracker changes to OFF status |
| Camera Initiated Movement | (2) | Tracker changes to OFF status |
| Timing Out of Camera Initiated Movement | (3) | Tracker changes to Looking for Target status |
| Timing Out of Joystick Movement | (3) | Tracker changes to Looking for Target status |
| On Command from Head End Unit | (4) | Tracker changes to Looking for Target status |
| Off Command from Head End Unit | (4) | Tracker changes to OFF status |

In alternative embodiments, the tracking unit may give up control of camera 22 during human operator and/or camera initiated movement of camera and continue to analyze the images acquired by camera 22 to detect target objects. The continued detection of target objects while the camera is under the control of an operator or separate controller is possible because the tracking unit 50 does not require the images used to detect the target object to be acquired while the camera is stationary or for the images to each have the same field of view.

Figure 5:
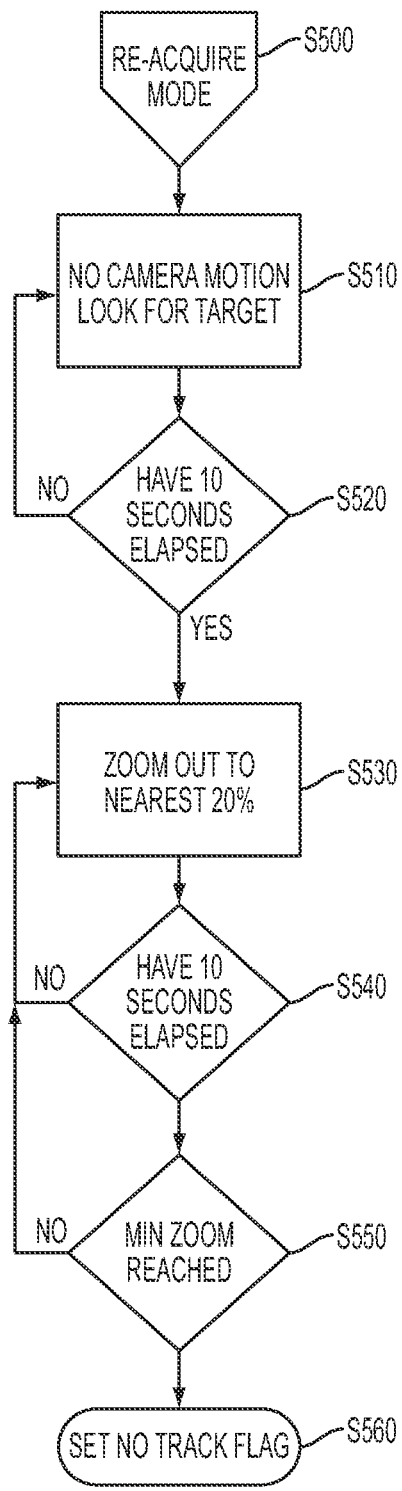
FIG. 5 is a flow chart representing the reacquisition subroutine which is used when the target object is lost.

Once tracking unit 50 has detected a target object, it will continuously track the target object until it can no longer locate the target object, for example, the target object may leave the area which is viewable by camera 22 or may be temporarily obscured by other objects in the FOV. When unit 50 first loses the target object it will enter into a reacquisition subroutine. If the target object is reacquired, tracking unit will continue tracking the target object, if the target has not been found before the completion of the reacquisition subroutine, tracking unit 50 will change its status to Looking for Target and control of the camera position will be returned to either the camera controller or the human operator. The reacquisition subroutine is graphically illustrated by the flow chart of FIG. 5. In the reacquire mode, tracking unit 50 first keeps the camera at the last position in which the target was tracked for approximately 10 seconds. If the target is not reacquired, the camera is zoomed out in discrete increments wherein the maximum zoom in capability of the camera corresponds to 100% and no zoom (i.e., no magnifying effect) corresponds to 0%. More specifically, the camera is zoomed out to the next lowest increment of 20% and looks for the target for approximately 10 seconds in this new FOV. The camera continues to zoom out in 20% increments at 10 second intervals until the target is reacquired or the camera reaches its minimum zoom (0%) setting. After 10 seconds at the minimum zoom setting, if the target has not been reacquired, the status of tracking unit 50 is changed to "Looking for Target", the position of camera 22 returns to a predefine position or "tour" and the positional control of the camera is returned to the operator or the controller embedded within camera 22.

As described above, system 20 uses a general purpose video processing platform that obtains video and camera control information from a standard PTZ camera. This configuration and use of a standard PTZ camera also allows for the retrofitting and upgrading of existing installations having installed PTZ cameras by the installing tracking units 50 and coupling tracking units 50 with the existing PTZ cameras. A system which could be upgraded by the addition of one or more tracking units 50 is discussed by Sergeant et al. in U.S. Pat. No. 5,517,236 which is hereby incorporated herein by reference. By providing tracking units 50 with a sheet metal housing their mounting on or near a PTZ camera to provide for PTZ control using image processing of the source video is facilitated. System 20 thereby provides a stand alone embedded platform which does not require a personal computer-based tracking system.

The present invention can be used in many environments where it is desirable to have video surveillance capabilities. For example, system 20 may be used to monitor manufacturing and warehouse facilities and track individuals who enter restricted areas. Head end unit 32 with display 38 and input devices 34 and 36 may be positioned at a location remote from the area being surveyed by camera 22 such as a guard room at another location in the building. Although system 20 includes a method for automatically detecting a target object, the manual selection of a target object by a human operator, such as by the operation of joystick 36, could also be employed with the present invention. After manual selection of the target object, system 20 would track the target object as described above for target objects identified automatically.

While this invention has been described as having an exemplary design, the present invention may be further modified within the spirit and scope of this disclosure. This application is therefore intended to cover any variations, uses, or adaptations of the invention using its general principles.

What is claimed is:

1. A video tracking system comprising:
a video camera having a field of view, said camera being selectively adjustable wherein adjustment of said camera varies the field of view of said camera; and
at least one processor operably coupled to said camera wherein said processor automatically and continuously acquires video images acquired by said camera and continuously selectively adjusts said camera;
said processor programmed to:
detect a moving target object in said video images, said video images including a first image and a second image;
detect a second moving target object in said video images;
estimate a distance between the moving target object and the video camera;
determine sizes of the moving target object and the second moving target object;
determine a velocity for only the moving target object when the moving target object is at least a 20% larger size than the second moving target object based on positions of the moving target object in the first and second images and the distance between the moving target object and the video camera;
determine a velocity for only the second moving target when the second moving target object is at least a 20% larger size than the moving target object;
randomly select either the moving target object or the second moving target to determine a velocity for either the moving target object or the second moving target object when the size differences of the moving target object and the second moving are within 20%;
select a first adjustment rate, said first adjustment rate being a function of said determined velocity;
adjust said camera at said first adjustment rate;
wherein after selecting the first adjustment rate the processor automatically receives a subsequent image and performs said process again based on a comparison of the subsequent image and at least one of the first image and the second image to select a second adjustment rate, the camera being continuously moved at the first adjustment rate until being commanded to move at the second adjustment rate, where after the camera is continuously moved at the second adjustment rate without a stationary interval between the continuous movement at the first adjustment rate and the continuous movement at the second adjustment rate.

2. The video tracking system of claim 1 wherein said camera is selectively adjustable at a variable rate in adjusting at least one of a panning orientation of said camera and a tilt orientation of said camera.

3. The tracking system of claim 1 wherein selective adjustment of said camera includes selective panning movement of said camera, said panning movement defining an x-axis, selective tilting movement of said camera, said tilting movement defining a y-axis, and selective focal length adjustment of said camera, adjustment of the focal length defining a z-axis, said x, y and z axes oriented mutually perpendicular.

4. The tracking system of claim 3 wherein said processor adjusts said camera at a selected panning rate, said selected panning rate being a function of the determined velocity along said x-axis and said processor adjusts said camera at a selected tilting rate, said selected tilting rate being a function of the determined velocity along said y-axis.

5. The tracking system of claim 1 wherein said first image is acquired by said camera adjusted to define a first field of view and said second image is acquired by said camera adjusted to define a second field of view.

6. The tracking system of claim 5 wherein said first and second fields of view are partially overlapping and wherein selection of said adjustment rate by said processor includes identifying and aligning at least one common feature represented in each of said first and second images.

7. The tracking system of claim 5 wherein said camera is continuously adjusted at the first selected adjustment rate until said processor selects the second adjustment rate and communicates said second adjustment rate to said camera, wherein the camera is adjusted at the second adjustment rate upon the processor communicating the second adjustment rate to the camera.

8. The tracking system of claim 7 wherein said camera defines a third field of view as said camera is adjusted at said first selected adjustment rate and wherein the subsequent image is acquired by said camera when defining said third field of view, said first, second and third images being consecutively analyzed by said processor.

9. The tracking system of claim 1 wherein said camera has a selectively adjustable focal length and said processor selects the focal length of said camera as a function of the distance of the target object from said camera.

10. The tracking system of claim 1 further comprising a display device and an input device operably coupled to said system wherein an operator may view said video images on said display device and input commands or data into said system through said input device, said display device and input device being positionable remote from said camera.

11. The video tracking system of claim 1, wherein to determine the velocity of the moving target object, said processor uses at least one of: a rotation matrix method and a homography matrix method.

12. The video tracking system of claim 1, wherein the time interval between images acquired by said processor is substantially constant.

13. The video tracking system of claim 1, said processor being further programmed to:
    determine the moving target object is no longer detected; and
    send a signal to the video camera to zoom out in response to determining the moving object is no longer detected for a predetermined amount of time.

* * * * *